United States Patent
Zhao et al.

(10) Patent No.: US 9,142,970 B2
(45) Date of Patent: Sep. 22, 2015

(54) POWER ON AND OFF TESTING DEVICE AND METHOD

(71) Applicant: ShenZhen Goldsun Network Intelligence Technology Co., Ltd., ShenZhen (CN)

(72) Inventors: Jian Zhao, Wuhan (CN); Zhong-Gang Wu, Wuhan (CN); Guo-Shu Wang, Wuhan (CN)

(73) Assignee: ShenZhen Goldsun Network Intelligence Technology Co., Ltd., ShenZhen (CN)

( * ) Notice: Subject to any disclaimer, the term of this patent is extended or adjusted under 35 U.S.C. 154(b) by 448 days.

(21) Appl. No.: 13/719,950

(22) Filed: Dec. 19, 2012

(65) Prior Publication Data

US 2013/0293030 A1    Nov. 7, 2013

(30) Foreign Application Priority Data

May 2, 2012    (CN) .......................... 2012 1 0131715

(51) Int. Cl.
```
H02J 4/00      (2006.01)
G06F 11/22     (2006.01)
G06F 1/28      (2006.01)
G06F 11/24     (2006.01)
```

(52) U.S. Cl.
CPC ... *H02J 4/00* (2013.01); *G06F 1/28* (2013.01); *G06F 11/2284* (2013.01); *G06F 11/24* (2013.01); *Y10T 307/826* (2015.04)

(58) Field of Classification Search
CPC ....... G06F 1/28; G06F 11/2284; G06F 11/24; H02J 4/00; Y10T 307/826
USPC .......................................................... 307/125
See application file for complete search history.

(56) References Cited

U.S. PATENT DOCUMENTS

| | | | |
|---|---|---|---|
| 8,607,079 B2 * | 12/2013 | Chen | 713/300 |
| 2002/0157053 A1 * | 10/2002 | Chen et al. | 714/744 |
| 2008/0270079 A1 * | 10/2008 | Delory | 702/186 |
| 2010/0213027 A1 * | 8/2010 | Co et al. | 198/346.1 |

* cited by examiner

*Primary Examiner* — Scott Bauer
(74) *Attorney, Agent, or Firm* — Novak Druce Connolly Bove + Quigg LLP

(57) ABSTRACT

A power on and off testing device includes a control module, a switch module, an alternating current and direct current converter module, an input module, and a detecting module. The switch module is connected to an alternating current source. The alternating current and direct current converter module is connected to a motherboard of a computer. The input module is connected to the control module to input testing references to the control module. The detecting module is connected between the control module and the motherboard. The detecting module detects a power status of the motherboard and sends the power status to the control module. The control module controls the switch module to be switched on according to the power status after receiving the testing references, thereby controlling the alternating current source to supply power to the motherboard.

8 Claims, 2 Drawing Sheets

POWER ON AND OFF TESTING DEVICE AND METHOD

BACKGROUND

1. Technical Field

The disclosure generally relates to a power on and off testing device and method.

2. Description of Related Art

Testing power supplies of computers is an important step in producing computers. A common method for testing the power supply is to manually press the button of the power supply, which is inefficient.

Thus, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

In general, the word "module," as used herein, refers to logic embodied in hardware or firmware, or to a collection of software instructions, written in a programming language, such as, for example, Java, C, or Assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
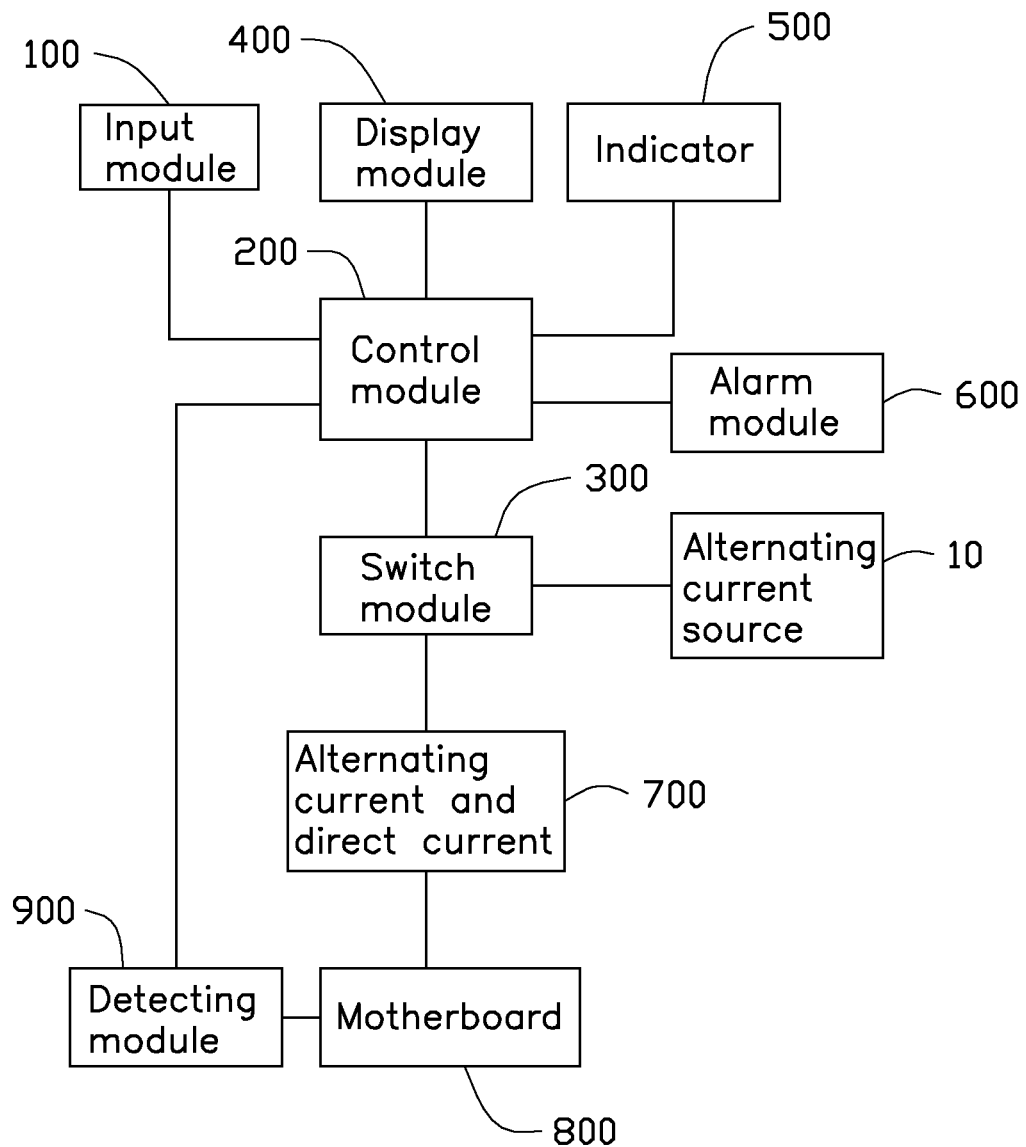
FIG. 1 is a schematic view of a power on and off testing device in accordance with an embodiment.

FIG. 1 shows one embodiment of a power on and off testing device. The power on and off testing device includes an input module 100, a control module 200, a switch module 300, a display module 400, an indicator 500, and an alarm module 600, an alternating current and direct current converter module 700, and a detecting module 900. The switch module 300 is connected to an alternating current source 10.

The input module 100, the display module 400, the indicator 500, the alarm module 600, and the detecting module 900 are connected to the control module 200. The switch module 300 is connected to the control module 200 and a motherboard 800 of a computer (not shown). In one embodiment, the control module 200 is a control chip, the input module 100 is a button assembly, the display module 400 is liquid crystal display (LCD), the indicator 500 is a light-emitting diode (LED), and the alarm module 600 is a buzzer.

The input module 100 inputs testing references to the control module 200, such as testing times. The detecting module 900 detects the power status of the motherboard 800, and sends the power status to the control module 200. The control module 200 controls the switch module 300 to be switched on or off according to the testing references and the power status. The alternating current source 10 supplies power to the motherboard 800 via the alternating current and direct current converter module 700 after the switch module 300 is switched on, and the control module 200 sends a power on signal to motherboard 800. The alternating current source 10 stops to supply power to the motherboard 800 after the switch module 300 is switched off, and the control module 200 sends a power off signal to motherboard 800. The control module 200 displays a testing result on the display module 400. The indicator 500 indicates that the motherboard 800 is powered on. The alarm module 600 gives out an alarm when the motherboard 800 is powered on abnormally.

Figure 2:
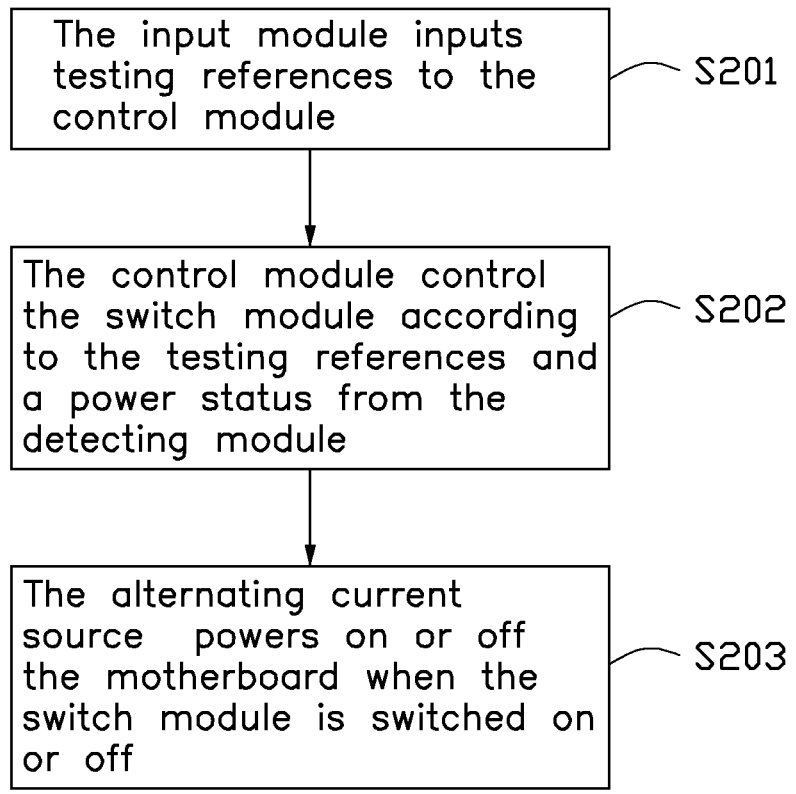
FIG. 2 is a flow chart of a power on and off testing method in accordance with an embodiment.

FIG. 2 shows an embodiment of a power on and off testing method. The power on and off testing method includes the following steps.

S201, the input module 100 inputs testing references to the control module 200.

S202, the control module 200 controls the switch module 300 to be switched on or off according to a power status of the motherboard 800 from the detecting module 900 after receiving the testing references and the power status.

S203, the alternating current source 10 supplies power to the motherboard 800 when the power status is that motherboard 800 is powered off and the switch module 300 is controlled to be switched off, and the alternating current source 10 stops to supply power to the motherboard 800 when the power status is that motherboard 800 is powered on and the switch module 300 is controlled to be switched on.

It is to be understood, however, that even though numerous characteristics and advantages have been set forth in the foregoing description of embodiments, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A power on and off testing device, comprising:
   a control module;
   a switch module, the switch module is configured to be connected to an alternating current source;
   an alternating current and direct current converter module, the alternating current and direct current converter module is configured to be connected to a motherboard of a computer; and
   an input module, the input module is connected to the control module to input testing references to the control module;
   a detecting module, the detecting module is configured to be connected between the control module and the motherboard; the detecting module is configured to detect a power status of the motherboard and send the power status to the control module;
   wherein the control module is configured to control the switch module to be switched on according to the power status after receiving the testing references, thereby controlling the alternating current source to supply power to the motherboard; and the control module is configured to control the switch module to be switch on and send a power on signal to the motherboard, when the power status is that the motherboard is powered off, to be switched off when the power status is that the motherboard is powered on.

2. The power on and off testing device of claim 1, further comprising a display module, wherein the control module is further configured to display a testing result on the display module.

3. The power on and off testing device of claim 1, further comprising an indicator, wherein the indicator is configured to indicate that the motherboard is powered on.

4. The power on and off testing device of claim 1, further comprising an alarm module, wherein the alarm module is configured to give an alarm when the motherboard is powered on abnormally.

5. A power on and off testing method, comprising:
 providing a power on and off testing device, the power on and off testing device comprises a control module, a switch module, an alternating current and direct current converter module, an input module, and a detecting module;
 receiving testing references, inputted by the input module, and a power status of a motherboard, detected by the detecting module, via the control module;
 controlling the switch module to be switched on or off according to the power status, thereby controlling an alternating current source, connected to the switch module, to supply power to the motherboard, wherein the switch module is controlled to be switched off when the power status is that the motherboard is powered on, and when the motherboard is powered off, the switch module is controlled to be switched on and the control module sends a power on signal to the motherboard.

6. The power on and off testing method of claim 5, further comprising displaying a testing result on a display module via the control module.

7. The power on and off testing method of claim 5, further comprising indicating that the motherboard is powered on via an indicator.

8. The power on and off testing method of claim 5, further comprising giving an alarm when the motherboard is powered on abnormally.

* * * * *